United States Patent [19]

Inazawa et al.

[11] Patent Number: 5,712,838

[45] Date of Patent: Jan. 27, 1998

[54] METHOD AND APPARATUS FOR RECORDING ON A DISK MEDIUM A ΣΔ-MODULATED SIGNAL WITH A SAMPLING FREQUENCY N×44.1 KHZ

[75] Inventors: Yoshizumi Inazawa; Tadao Suzuki, both of Tokyo, Japan

[73] Assignee: Sony Corporation, Tokyo, Japan

[21] Appl. No.: 746,840

[22] Filed: Nov. 18, 1996

[30] Foreign Application Priority Data

Nov. 24, 1995 [JP] Japan .................................. 7-329894

[51] Int. Cl.$^6$ ............................................ H04N 5/76
[52] U.S. Cl. ........................................ 369/59; 369/58
[58] Field of Search ............................ 369/59, 48, 47, 369/54, 58, 32, 61, 62, 124

[56] References Cited

U.S. PATENT DOCUMENTS

| | | | |
|---|---|---|---|
| 4,707,818 | 11/1987 | Suzuki et al. | 369/59 |
| 4,891,646 | 1/1990 | Wiegand | 369/61 |

*Primary Examiner*—Nabil Hindi
*Attorney, Agent, or Firm*—Jay H. Maioli

[57] ABSTRACT

A recording method for a disc-shaped recording medium formed by cementing two disc members having a recording layer on one surface, a diameter of approximately 12 cm and a thickness of approximately 0.6 mm, includes the steps of generating a digital audio signal that is generated by performing the standard compact disc sampling; ΣΔ-modulation for converting an analog audio signal with a sampling frequency set to a multiple of a frequency fs=44.1 kHz, and recording the generated digital audio signal to the disc-shaped recording medium.

11 Claims, 8 Drawing Sheets

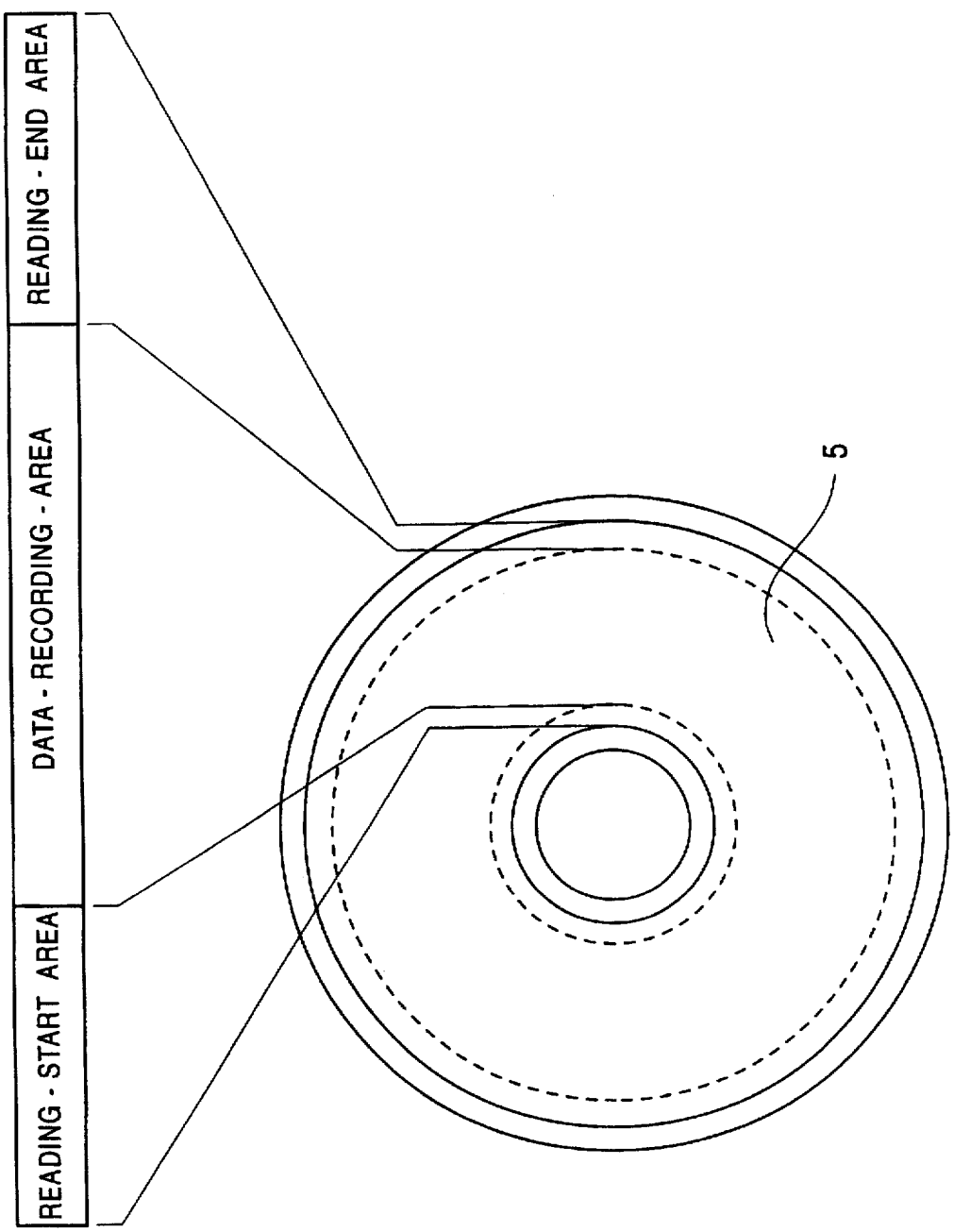

| BYTE POSITION | CONTENTS | NUMBER OF BYTES |
|---|---|---|
| 1 | BOOK TYPE & VERSION | 1 BYTE |
| 2 | DISC SIZE & LEAST RATE READING - END | 1 BYTE |
| 3 | DISC STRUCTURE | 1 BYTE |
| 4 | RECORDING DENSITY | 1 BYTE |
| 5 ~ 16 | DATA - RECORDING - AREA ALLOCATION | 12 BYTES |
| 17 ~ 2048 | RESERVE | 2032 BYTES |

| | |
|---|---|
| $D_0$ | $L_0$ |
| $D_1$ | $R_0$ |
| $D_2$ | $L_1$ |
| $D_3$ | $R_1$ |
| $D_4$ | $L_2$ |
| $D_5$ | $R_2$ |
| $D_6$ | $L_3$ |
| $D_7$ | $R_3$ |
| ⋮ | ⋮ |
| $D_{2044}$ | $L_{1022}$ |
| $D_{2045}$ | $R_{1022}$ |
| $D_{2046}$ | $L_{1023}$ |
| $D_{2047}$ | $R_{1023}$ |

# METHOD AND APPARATUS FOR RECORDING ON A DISK MEDIUM A ΣΔ-MODULATED SIGNAL WITH A SAMPLING FREQUENCY N×44.1 KHZ

BACKGROUND OF THE INVENTION

1. Field of the Invention

This invention relates to recording methods for disc-shaped recording media, reproducing apparatuses for disc-shaped recording media, and disc-shaped recording media. In particular, this invention relates to a method for recording to a disc-shaped recording medium in which a digital audio signal is recorded, an apparatus for reproducing from a disc-shaped recording medium in which a digital audio signal is recorded, and a disc-shaped recording medium in which a digital audio signal is recorded.

2. Description of the Related Art

Compact discs are in wide use as a type of recording medium to which an audio signal is converted and recorded in the form of a digital signal or from which medium such an audio signal can be reproduced. According to the standard for compact discs, an analog audio signal is sampled corresponding to each right or left channel at a sampling frequency of fs=44.1 kHz, and each sample is converted and recorded as a 16-bit digital signal.

In the compact disc, an analog audio signal which is to be recorded corresponding to each channel is processed such that its frequency band of not less than 22 kHz is filtered due to the above-mentioned limited sampling rate in the standard. Therefore, the harmonics originally included in a sound are limited, which thus causes a deterioration in tone quality such as a lack of natural sense.

Another standard in which a sampling frequency of 96 kHz corresponding to each channel where each sample is recorded as a 24-bit signal has been proposed. Although some improvement has been observed, deterioration in tone quality cannot be avoided even when this standard is employed, similar to the former standard due to limited harmonics.

In addition, recently for analog-to-digital or digital-to-analog converters, a converter employing the ΣΔ-modulation method in which quantized noise is concentrated within a high frequency by providing a quantizer in a feedback loop, has been widely noticed. This converter is used for recording to or reproducing from compact discs.

FIG. 1 is a system block diagram showing the flow of an audio signal recorded or reproduced with respect to a compact disc using the ΣΔ-modulation method, based on the standard for compact discs.

A ΣΔ-converter 11 converts an analog signal "Au" into a digital audio signal "Da" having 1 bit per sample (this digital audio signal having 1 bit per sample is hereinafter referred to as the "1-bit audio signal") by using a sampling frequency of 64·fs (=2.8224 MHz). The 1-bit audio signal is supplied to a digital filter 12. This digital filter 12 performs thinning-out (down-sampling) with respect to the supplied signal for conversion into a digital audio data "Db" having 16 bits per sample by using the sampling frequency denoted by fs, which data satisfies the standard for compact discs.

The digital audio data Db is supplied to an encoding circuit 13, in which processes such as scrambling and error-correcting-encoding and eight-to-fourteen modulation are performed with respect to the supplied data, so that the processed and modulated data is recorded as serial data by a recording optical head (not shown) to a disc-shaped recording medium 14.

The serial audio data recorded to this disc-shaped recording medium 14 is read by a reproducing optical head (not shown) to be supplied to a decoding circuit 15. This decoding circuit 15 converts the serial data into parallel data, and performs processes such as de-scrambling and error-correcting-decoding to form reproduced digital audio data "Dbp" having 16 bits per sample by using the sampling frequency fs.

This reproduced digital audio data Dbp is supplied to a digital filter 16, in which interpolation (over-sampling) is performed with respect to the supplied data in response to the thinning-out on the recording side, and the interpolated output data is supplied to a ΣΔ-modulator 17. The ΣΔ-modulator 17 converts the supplied data into a 1-bit audio signal "Dap" by using a sampling frequency of 64×fs.

The 1-bit audio signal Dap from the ΣΔ-modulator 17 is supplied to an analog low-pass filter 18 to be restored to an analog audio signal "Aup".

When the ΣΔ-modulation is used in analog-to-digital and digital-to-analog conversion as described above, a wide dynamic range is obtained with a small number of bits by increasing the sampling frequency.

However, according to the case shown in FIG. 1, in the recording mode the digital filter 12 performs thinning-out with respect to the digital audio data having 16 bits per sample at the sampling frequency fs based on the standard for compact discs, while in the reproducing mode the digital filter 16 performs interpolation. Accordingly, a computing error occurs in the process in which the data passes through the digital filters 12 and 16, and this error causes a deterioration in tone quality.

On the other hand, with the development for practical use of media having a large capacity and a high transfer rate, recording methods and apparatuses for a digital audio signal sampled at a greater number of bits and at a higher frequency have been proposed, compared with the present standard for compact discs at a sampling frequency of fs=44.1 kHz and 16 bits per sample. Such circumstances cause increasing dissatisfaction with the tone quality of the compact disc, and as a result, enthusiasm for realizing the next-generation of compact discs has increased.

As the next-generation of compact discs will not be limited to audio-use, Toshiba Corporation and Matsushita Electric Industrial Co., Ltd. in Japan have proposed a type of disc for realizing a recording capacity of 5 GB on one surface (referred to as the "SD (super density disc) standard" hereinafter), where the disc has a thickness of 1.2 mm formed by cementing two thin discs being 12 cm in diameter and 0.6 mm thick, similar to the present compact disc. Also, Phillips in the Netherlands and Sony Corporation in Japan have proposed another type of disc for realizing a recording capacity of 3.7 GB on one surface (referred to as the "MMCD (multi-media compact disc)" hereinafter), which has a single-disc structure of the same size as the present compact disc. In addition, a further type of disc realizing an intermediate recording capacity of 4.7 GB on one surface, between the SD standard and the MMCD standard, has been proposed.

These types of discs have been proposed as digital video discs (referred to as "DVDs", hereinafter) or data memories for computers.

SUMMARY OF THE INVENTION

To eliminate the above-mentioned problems, it is an object of the present invention to provide a recording method for a disc-shaped recording medium.

It is another object of the present invention to provide a reproducing apparatus for a disc-shaped recording medium.

It is a further object of the present invention to provide a recording/reproducing method for a disc-shaped recording medium.

It is still another object of the present invention to provide a disc-shaped recording medium.

Accordingly, in accordance with an aspect of the present invention, the foregoing object is achieved through the provision of a recording method for a disc-shaped recording medium. Such a recording method includes the steps of: performing ΣΔ-modulation for converting an analog audio signal to generate a digital audio signal having 1 bit per sample by using a sampling frequency being n times as many as a frequency fs so as to correspond to each channel, where the frequency fs=44.1 kHz, and n represents an integer; and recording the digital audio signal having 1 bit per sample to the disc-shaped recording medium.

According to another aspect of the present invention, the foregoing object is achieved through the provision of a reproducing apparatus for a disc-shaped recording medium having both a first recording region in which a digital audio signal is recorded and a second recording medium in which signals including a discrimination signal for discriminating the type of the digital audio signal recorded in the first recording region are recorded. The digital audio signal has 1 bit per sample and is generated by performing ΣΔ-modulation for converting an analog audio signal with a sampling frequency set to a multiple of a frequency fs so as to correspond to each channel at the frequency fs=44.1 kHz. The reproducing apparatus has reading means, determination means, reproducing means, and low-pass-filter means. The reading means reads the signals recorded in the disc-shaped recording medium. The determination means determines whether or not the reproducing apparatus is loaded with the disc-shaped recording medium having 1 bit per sample and being generated by performing ΣΔ-modulation for converting an analog audio signal with a sampling frequency set to a multiple of a frequency fs so as to correspond to each channel at the frequency fs=44.1 kHz. The reproducing means reproduces the digital audio signal having 1 bit per sample corresponding to each channel, from an output signal read by the reading means when it has been determined that the reproducing apparatus is loaded with the disc-shaped recording medium having 1 bit per sample and being generated by performing ΣΔ-modulation for converting an analog audio signal with a sampling frequency set to a multiple of a frequency fs so as to correspond to each channel at the frequency fs=44.1 kHz. The low-pass-filter means is supplied with the digital audio signal, having 1 bit per sample corresponding to each channel, outputted by the reproducing means, and outputs an analog audio signal.

According to a further aspect of the present invention, the foregoing object is achieved through the provision of a recording or reproducing method for a disc-shaped recording medium having both a first recording region in which a digital audio signal is recorded and a second recording medium in which signals including a discrimination signal for discriminating the type of the digital audio signal recorded in the first recording region are recorded. Such a reproducing method includes the steps of: performing ΣΔ-modulation for converting an analog audio signal to generate a digital audio signal having 1 bit per sample by using a sampling frequency being n times as many as a frequency fs so as to correspond to each channel, where the frequency fs=44.1 kHz, and n represents an integer; recording the digital audio signal having 1 bit per sample to the disc-shaped recording medium; reproducing the digital audio signal having 1 bit per sample by reading the recorded signals; and outputting the reproduced digital audio signal having 1 bit per sample through the low-pass-filter means.

According to still another aspect of the present invention, the foregoing object is achieved through the provision of a disc-shaped recording medium having a first signal-recording region and a second signal-recording region. In the first signal-recording region a digital audio signal is recorded or a digital audio signal having 1 bit per sample by using a sampling frequency being n times as many as a frequency fs so as to correspond to each channel, where the frequency fs=44.1 kHz, and n represents an integer, is recorded. The second signal-recording region is formed inside the first signal-recording region. In the second signal-recording region, signals including a discrimination signal are recorded. The discrimination signal discriminates whether is recorded or not, in the first signal-recording region, the digital audio signal having 1 bit per sample by using a sampling frequency being n times as many as a frequency fs so as to correspond to each channel, where the frequency fs=44.1 kHz, and n represents an integer.

BRIEF DESCRIPTION OF THE DRAWINGS

FIG. 3 is a chart showing the recording area of the disc according to the embodiment of the present invention.

DESCRIPTION OF THE PREFERRED EMBODIMENTS

By referring to the attached drawings, a disc-shaped recording medium and a recording apparatus and a reproducing apparatus therefor according to embodiments of the present invention will be described below. As a disc-shaped recording medium according to one embodiment of the present invention, described below, a disc based on a unified standard formed by changing the signal modulationdemodulation method from eight-to-fifteen modulation to EFM (Eight-to-Fourteen Modulation) plus in the above-mentioned SD standard is used. The reason to use such a disc based on the already established standard is that reliability has already been obtained in the recording or reproducing of data, and the recording capacity and a transfer rate are sufficient.

Part of the SD standard is used as the standard for the disc-shaped recording medium according to the embodiment.

Figure 2:
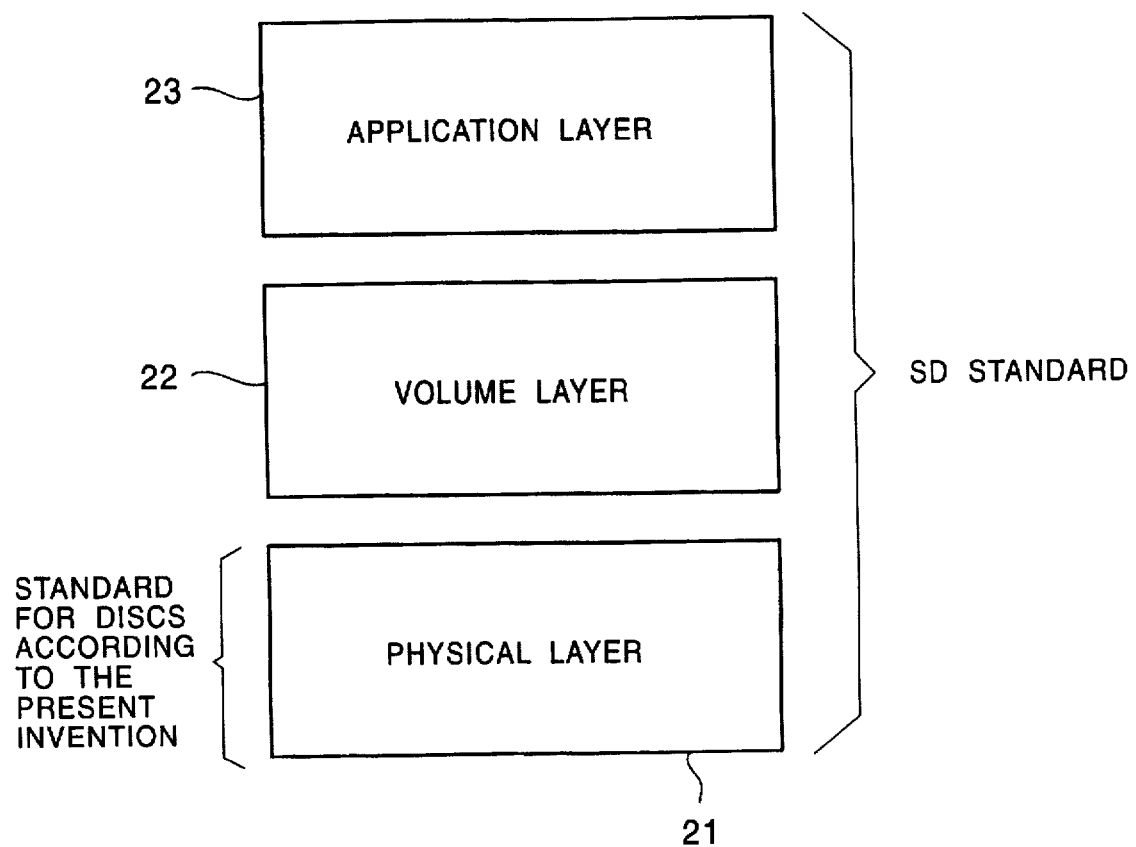
FIG. 2 is a chart showing the configuration of data in a disc according to one embodiment of the present invention.

FIG. 2 shows the schematic structure of the SD standard, almost similar to the unified standard. The structure has a volume layer 22 on a physical layer 21, and an application layer 23 defined on the volume layer 22.

The physical layer 21 determines the disc specification, the track structure, the sector structure, the recording and modulation method, the reading-start, the intermediate, and the reading-end. Since the recording of information to this disc-shaped recording medium is performed in units of sectors, the structure of recording in units of sectors is defined by the sector structure. The detailed sector structure will be described below.

The volume layer 22 determines the employment of UDF and so forth. The application layer 23 determines application formats such as MPEG2 (moving picture image coding expert group phase 2) for a video-signal compressing method and an audio-signal compressing method for "Dolby AC-3" or "MPEG audio".

The standard for the disc-shaped recording medium according to the embodiment utilizes only the physical layer 21 shown in FIG. 2, and has a structure in which audio data is directly recorded on the physical layer 21.

The specification of the disc-shaped recording medium (referred to as simply the "disc", hereinafter) according to the embodiment is the same as the specification of the SD standard disc. The disc is 12 cm in diameter, and 1.2 mm thick, and formed by cementing two thin disc plates being 0.6 mm thick. The RS-PC (Reed Solomon product code) is used as an error-correcting method. As a recording and modulation method, the eight-to-fifteen modulation method is employed in the SD standard, while the EFM plus is employed in the unified standard. The standard numerical aperture of an object lens, a track pitch, the shortest pitch length, and so forth are not definitely determined at present as the unified standard, which are subjects of discussion. Recording to or reproducing from the disc-shaped recording medium according to the present invention is performed in accordance with the determined standard.

As shown in FIG. 3, the innermost circumferential side of a disc 5 is used as the reading-start area, the outermost circumferential side of the disc 5 is used as the reading-end area, and the intermediate between both sides is used as the data-recording-area, when the disc 5 is a one-sided disc type having one recording layer as same as the compact disc, or is a two-sided disc type formed by overlaying two recording layers. As not shown in FIG. 3, when the disc 5 is a two-sided disc type formed by cementing disc plates provided with recording layers or a two-layer disc, for example, the innermost circumferential side of its lower disc is used as the reading-start area, and the innermost circumferential side of its upper disc is used as the reading-end area.

Figure 4B:
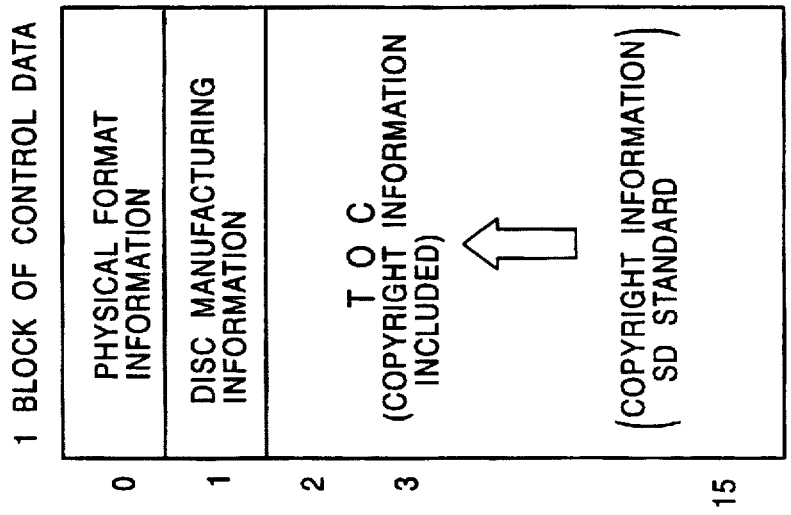
FIGS. 4A and 4B are charts showing the configuration of data recorded in the reading-start area of the disc according to the embodiment of the present invention.
Figure 4A:
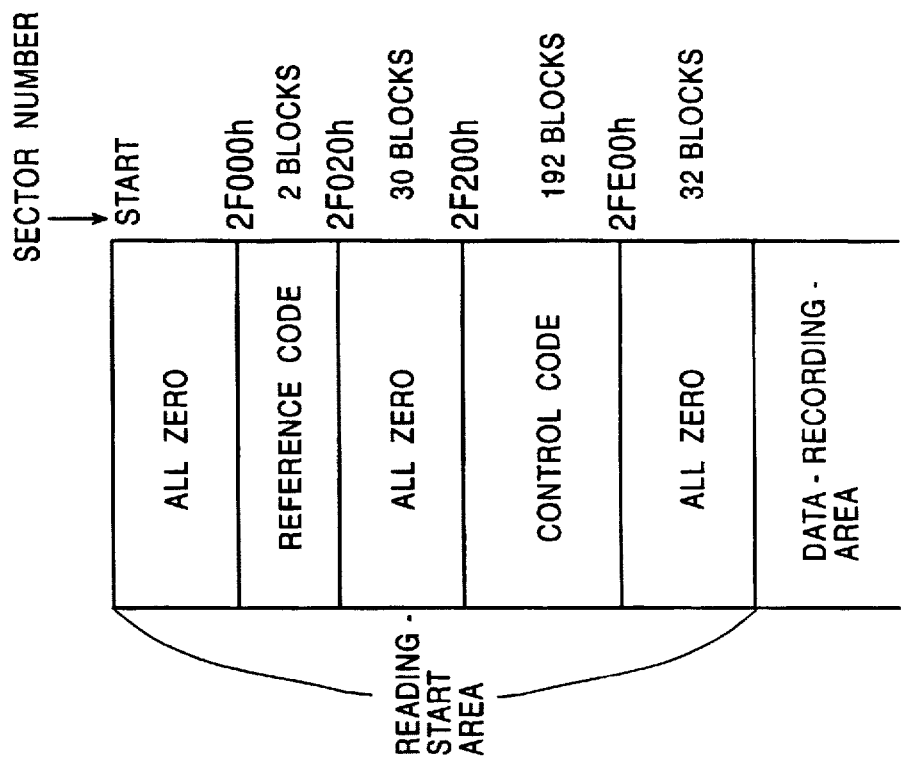

As shown in FIG. 4A, the reading-start area includes two blocks of a reference code and 192 blocks of control data, where one block consists of 16 data sectors (when the sector is simply used hereinafter it means this data sector).

FIG. 4B shows one block of the control data CTL. This one block consists of 16 sectors. Physical format information is written into the first sector 0. Disc-manufacturing information (which means information for the manufacture of discs) is written into the subsequent sector 1.

In the SD standard, copyright information concerning copyright is written into sectors 2 to 15. As also shown in FIG. 4B, in the disc according to the embodiment, TOC (table of contents) information is written instead of this copyright information.

In the embodiment, a disc name (which may be called a "disc title"), audio track names, an ISRC (international standard recording code), a catalog number, a copy management code, and so forth are written as the TOC information.

The audio track name is the name or title of each recorded music. The start and end positions of the audio track corresponding to each music are shown by a sector address (sector number (including a layer number)) and a byte position (byte number) included in main data in the sector, and are included in the TOC information.

In the embodiment, in consideration of the existence of the unified standard or the SD standard DVD disc, in order to discriminate between the audio disc according to the embodiment and the DVD disc, and in order to show that the disc according to the embodiment has high quality, the following definition is given to data for specifying the recorded data included in the physical format information in the first sector 0 in the one block of the control data in the reading-start area.

Figures 5, 6:
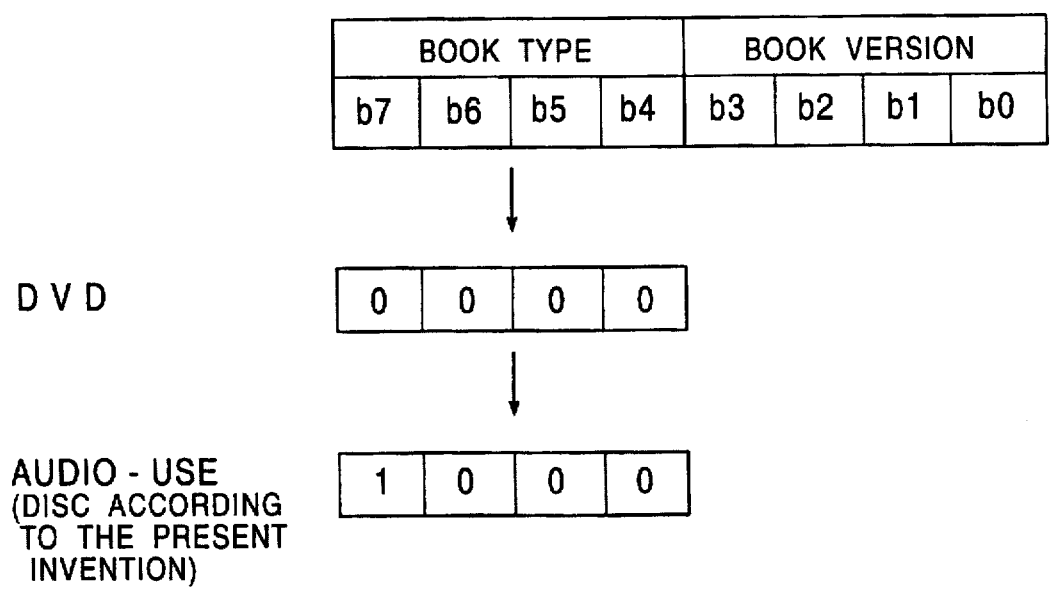
FIG. 5 is a table showing the configuration of data recorded in the reading-start area of the disc according to the embodiment of the present invention.
FIG. 6 is a chart showing the arrangement of data recorded in the reading-start area of the disc according to the embodiment of the present invention.

FIG. 5 shows the contents of the information included in the one sector of the physical format information, their byte positions in the main data in the sector, and the number of bytes forming them. In the book type and version at the byte position "1" of this physical information the book type is used as data to specify the recorded data in the discs.

Also, FIG. 6 shows the one byte of the book type and version. Its upper 4 bits b7 to b4 represent the information of the book type, while its lower 4 bits b3 to b0 represent the information of the book version.

The SD standard sets the book type as [b7, b6, b5, b4]=[0000], and this setting defines a read-only SD disc (super density disc specifications for read-only disc). Accordingly, the audio disc according to the embodiment is defined as a value other than the above-mentioned book type [b7, b6, b5, b4]=[0000], for example, the book type [b7, b6, b5, b4]=[1000] so as to be discriminated from the above-mentioned read-only SD disc.

Figures 7, 9:
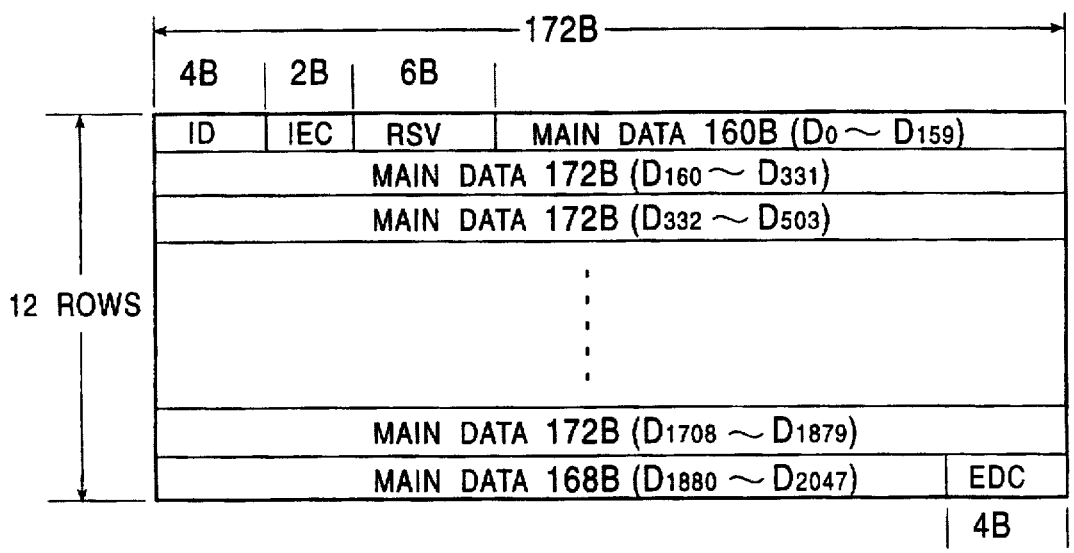
FIG. 7 is a chart showing the arrangement of data sectors of the disc according to the embodiment of the present invention.
FIG. 9 is a chart showing the arrangement of main data in the data sectors of the disc according to the embodiment of the present invention.

In FIG. 7 the structure of the data sector is shown. This data sector structure is the same as in the SD standard. As shown in FIG. 7, one sector consists of totally 16 bytes of additional data formed by the first 12 bytes and last 4 bytes of the one sector and 2048 bytes of main data D0 to D2047.

The first 4 bytes of the first 12 bytes as the additional data "ID" which in one sector represent identification data "ID" which includes sector information and a sector number. This sector information includes a sector format type, an area type (showing one of areas including the data-recording-area, the reading-start area and the reading-end area), and the layer number. The 2 bytes that follow the identification data represent an error-correcting code "IEC" for the identification data ID. The following 6 bytes represent reserve "RSV". The mentioned layer number is data related to a number for discriminating each recording layer from other recording layers when a plurality of recording layers are used in the two-sided disc type or two-layer disc type.

The last 4 bytes as the additional data in the sector represent an error-detecting code "EDC".

In the embodiment the audio data is recorded as the main data D0 to D2047 of the sector in accordance with the following manner.

Figure 8:
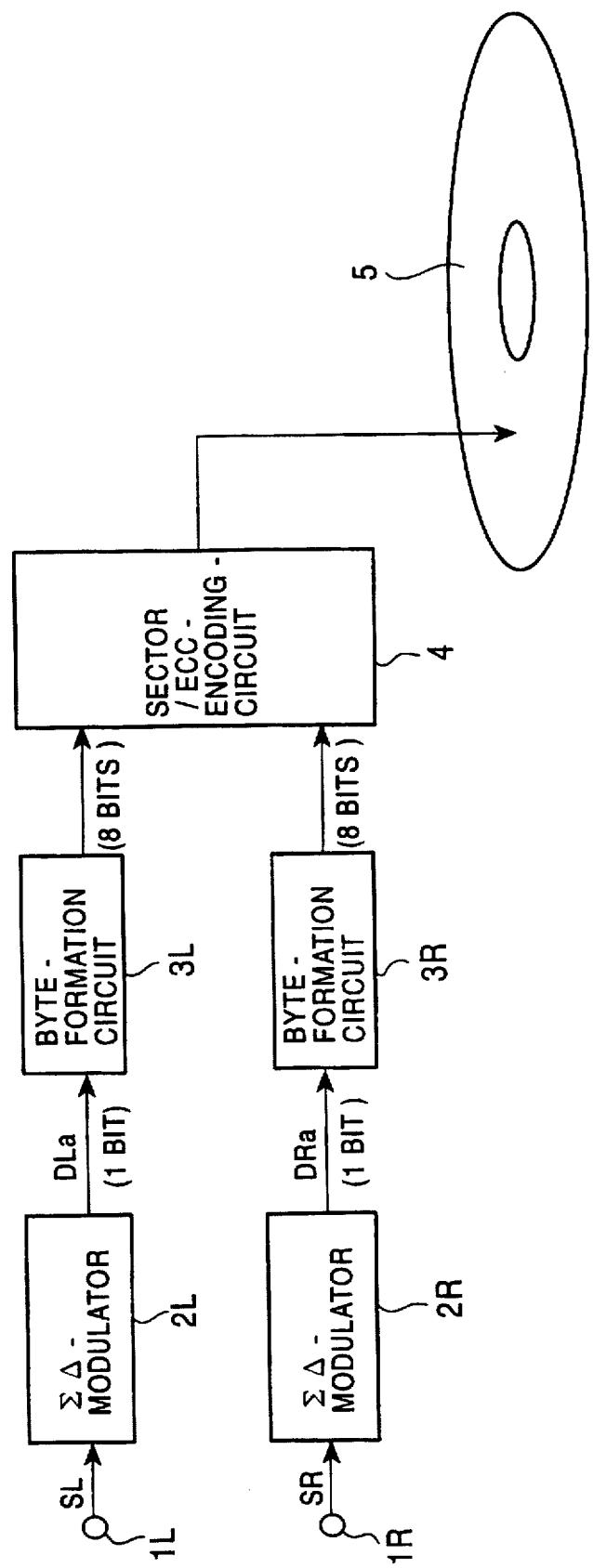
FIG. 8 is a block diagram showing the main components of a disc recording apparatus according to one embodiment of the present invention.

FIG. 8 shows the recording system of the recording apparatus for the disc-shaped recording medium according to one embodiment of the present invention. This example shown in FIG. 8 shows that 2-channel-stereo audio signals which consist of a left-channel signal and a right-channel signal are recorded to the above-mentioned disc 5.

As shown in FIG. 8, a left-channel analog audio signal "SL" inputted through an input terminal 1L and a right-channel analog audio signal "SR" inputted through an input terminal 1R are supplied to ΣΔ-modulators 2L and 2R, respectively.

These ΣΔ-modulators 2L and 2R perform ΣΔ-modulation to convert the respective audio signals 2L and 2R into high speed 1-bit audio signals "DLa" and "DRa" by using a sampling frequency that is a multiple of the sampling frequency fs used in the above-mentioned compact disc, for example, 64·fs (=2.8224 MHz).

These 1-bit audio signals DLa and DRa are supplied to byte-formation circuits 3L and 3R, respectively, and in which they are separated in every 8 bits to be superficially converted into byte-unit data. Byte-unit data L0, L1, L2, . . . and R0, R1, R2, . . . from the byte-formation circuits 3L and 3R are supplied to a sector/ECC-encoding-circuit 4.

This sector/ECC-encoding-circuit 4 has almost the same structure as a sector/ECC-encoding-circuit for recording-data to a SD-standard disc and performs the same signal processing because the disc 5 according to the embodiment is as same as the physical layer in the SD standard.

The sector/ECC-encoding-circuit 4 assigns the 8-bit-unit data L0, L1, L2, . . . and R0, R1, R2, . . . from the byte-formation circuits 3L and 3R to the respective bytes of the main data D0 to D2047.

The respective bytes of the main data D0 to D2047 and the byte-unit data L0, L1, L2, . . . and R0, R1, R2, . . . correspond to each other as shown in FIG. 9. The left-channel 8-bit-unit 1-bit audio data L0, L1, L2, . . . and the right-channel 8-bit-unit 1-bit audio data R0, R1, R2 . . . are alternately arranged as the byte-data D0 to D2047 of the main data in the sector.

In accordance with the specification of the SD standard as mentioned above, the sector/ECC-encoding-circuit 4 adds, to the main data, identification data ID, error-correcting code IEC for the identification data ID, reserve RSV, and error-detecting code EDC. Further, the main data is scrambled in accordance with the specification of the SD standard, so that one data sector is formed.

In the sector/ECC-encoding-circuit 4, error-correcting codes P0, P1 are generated and added by handling 16 data sectors as one unit to form one ECC block. These error-correcting codes are based on the RS-PC (Reed Solomon product code), and are expressed as P0 (208, 192, 17), P1 (182, 172, 11).

The code P0 is interleaved in the column unit, and is disposed in the last column of each sector, so that 16 recording-sectors are formed. A synchronizing code is added to the code in accordance with the SD standard, and the EFM plus modulation is performed with respect to the code. As a result, the code is recorded by the optical head (not shown), as a physical sector in the form of serial data on the disc 5. This physical sector is recorded in a data decode area. At this time, the disc 5 is being rotated at a constant linear velocity by a spindle motor (not shown).

In accordance with the above manner, the disc 5 obtains a recording capacity of 4.7 gigabytes. Therefore, the above-mentioned high-speed 1-bit audio signal does not need to pass through the down-sampling process by the thinning-out filter, and can be directly recorded.

In connection with this matter, the recording capacity of the compact disc is 650 gigabytes, thus, the recording capacity of the disc 5 is seven times greater or more. In the compact disc, an amount of data recorded corresponding to one channel is expressed as 44.1 (kHz)×16 (bits)=705.6 (kilobits).

To the contrary, an amount of data recorded to the disc 5 corresponding to each channel is expressed as 2.8224 (MHz) ×1 (bit)=2.8224 (megabits), which value is approximately 4 times greater than the value of the compact disc. Accordingly, as described above, the high-speed 1-bit audio data can be directly recorded to the disc 5 that has a seven times or more capacity than the capacity of the compact disc.

In this recording the control data and so forth are recorded in the reading-start area of the disc 5. The value [1000] that shows that the disc 5 is for an audio-use is recorded as the book type information of the physical format information in the control data, and the TOC information is also recorded.

As described above, the disc name, the music names and the position at which each music is recorded are recorded in the TOC information. As the position at which each music is recorded, the address of the data sector (or sector number) and the byte position of the main data in the data sector (or byte number) are recorded.

In data recorded to the compact disc a sub-code is recorded in the main data, and as the sub-code a time code is recorded. However, in the embodiment the main data, consisting of only the audio data, does not include data such as sub-codes.

In addition, byte-unit data and sectors are written into the disc at a constant transfer rate. Therefore, time information can be found from both the sector address and the byte number by computation in the reproducing mode, so that the time information is not directly recorded to the disc according to the embodiment.

Figure 10:
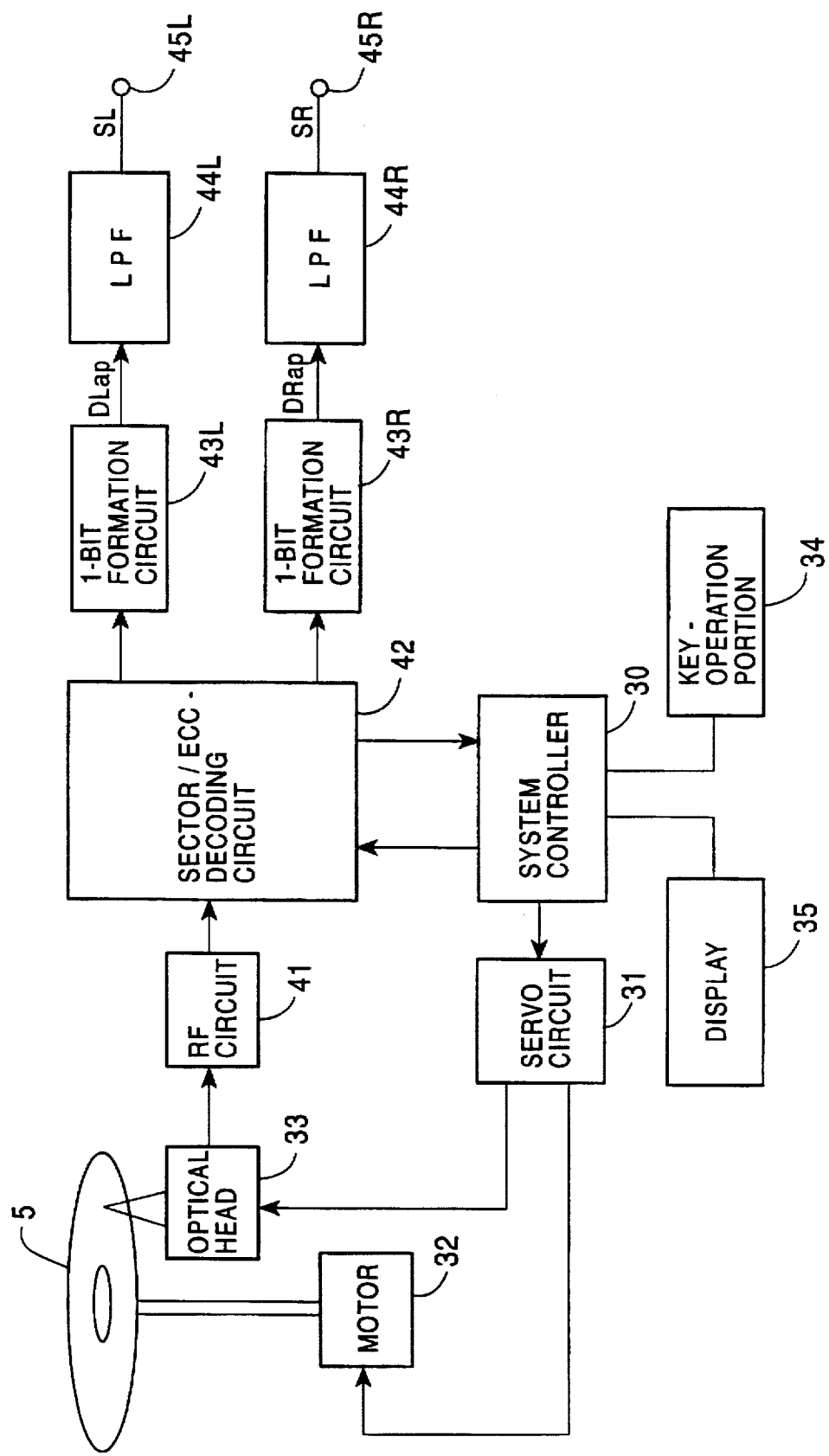
FIG. 10 is a block diagram showing a disc reproducing apparatus according to one embodiment of the present invention.

A system of reproducing from the disc 5 in which the audio data is recorded according to the above manner will be described below. In FIG. 10 a block diagram of a disc-reproducing apparatus according to an embodiment of the present invention is shown.

In FIG. 10, a system control circuit 30 controls the overall disc-reproducing apparatus. A servo-circuit 31 controls a spindle motor 32 in accordance with a servo-control signal from this system control circuit 30, and controls an actuator for sliding the object lens of an optical head 33 in the focussing direction and the tracking direction.

The spindle motor 32 for rotating a disc 5 receives a servo-signal from the servo-circuit 31, and rotates the disc 5 at a constant linear velocity.

The optical head 33 reads a signal from the disc 5, and supplies it to a RF amplifier 41. This RF amplifier 41 generates reproduced data from the signal form the optical head 33, and supplies it to a sector/ECC decoding circuit 42. The RF amplifier 41 generates error signals such as a focussing-error signal and a tracking-error signal, from the output signal of the optical head 33, and supplies it to the servo-circuit 31.

The servo-circuit 31 performs tracking control for controlling the tracing position of the optical head, and focussing control with respect to the optical head 33 so that the focussing-error signal and the tracking-error signal is controlled to be zero. The servo-circuit 31 also performs spindle-servo-operation by controlling the motor 32 so that the rotational linear velocity of the disc 5 becomes constant.

The sector/ECC decoding circuit 42 demodulates data that is modulated according to the EFM plus modulation before performs error correcting decoding by using the error-correcting codes P0 and P1. Subsequently, the sector/ECC decoding circuit 42 performs de-scrambling to restore the error-corrected data to the data sector as shown in FIG. 7.

The sector/ECC decoding circuit 42 also detects an error by using the error-detecting code EDC, and corrects (interpolates) a byte having an error by using its front and back bytes. The respective bytes D0 to D2047 of the main data in the resulting sector consist of, as shown in FIG. 9 mentioned above, the data obtained by separating the 2-channel (left and right) 1-bit audio data in the 8-bit unit, L0, L1, L2, . . . and L0, L1, L2, . . .

The sector/ECC decoding circuit 42 can be designed to have almost the same structure as a sector/ECC decoding circuit for reproducing from a SD-standard disc because the disc 5 according to the embodiment is as same as the physical layer in the SD standard.

The sector/ECC decoding circuit 42 alternatively separates the 8-bit unit data to supply the left-channel data L0, L1, L2, . . . to a 1-bit formation circuit 43L and to supply the right-channel data L0, L1, L2, . . . to a 1-bit formation circuit 43R.

Both 1-bit formation circuits 43L and 43R rearrange the 8-bit unit data in the form of 1-bit unit data, so that 1bit audio signals "DLap" and "DRap" converted by using a sampling frequency of 64 fs=2.8224 MHz are obtained.

Low-pass filters 44L and 44R are analog filters having a cut-off frequency of 100 kHz. The filters receive the 1-bit audio signals DLap and DRap, and restore them to the analog audio signals SL and SR.

A key-operation portion 34 includes a reproducing start key and a track number selection key. By operating this key-operation portion 34, a signal in accordance with the operated key is supplied to the system controller 30. The system controller 30 performs control in accordance with the key operation.

A display 35 displays, for example, the disc name or track number in the reproducing mode, based on information from the system controller 30.

Prior to substantial reproduction, data recorded in the reading-Start area of the disc 5 is read by the optical head 33. Control data included in the reading-start area is taken in the system controller 30 through the sector/ECC decoding circuit 42. The system controller 30 determines whether or not the type of the disc 5 is the audio disc according to the embodiment, by discriminating the book type information of the physical format information in the control data.

When the book type is [0000], the type is determined as a SD-standard read-only disc, for example, a DVD. Then, the display 35 shows that the disc loaded in the reproducing apparatus is not for audio-use, and reproduction is not performed.

When the book type is [1000], the system controller 30 determines that the disc loaded in the reproducing apparatus is for audio-use, and performs reproducing operations by using the above-described reproducing system.

Thereby, as the result of reproducing operations performed, left-channel data L0, L1, L2, . . . are supplied to the 1-bit formation circuit 43L, while right-channel data R0, R1, R2, . . . are supplied to the 1-bit formation circuit 43R, from the sector/ECC decoding circuit 42.

1-bit audio signals DLap and DRap converted by using a sampling frequency of 64 fs=2.8224 MHz corresponding to each channel are obtained from the 1-bit formation circuits 43L and 43R. These 1-bit audio signals DLap and DRap are supplied to the low-pass filters 44L and 44R, respectively, so that a left-channel analog audio signal SL and a right-channel analog audio signal SR are restored.

This left-channel analog audio signal SL and this right-channel analog audio signal SR are outputted from output terminals 45L and 45R.

As described above, it is possible to readily provide a hi-fi audio signal having a dynamic range of not less than 120 dB (20 kHz) and a frequency band of 100 kHz. Further, down-sampling of an audio signal by thinning-out with a digital filter in the reproducing mode and over-sampling by interpolating with a digital filter in the reproducing mode are not needed, and as a result, no deterioration occurs in the tone quality of the reproduced sound, and a hi-fi natural signal audio with natural sense can be realized.

Figure 1:
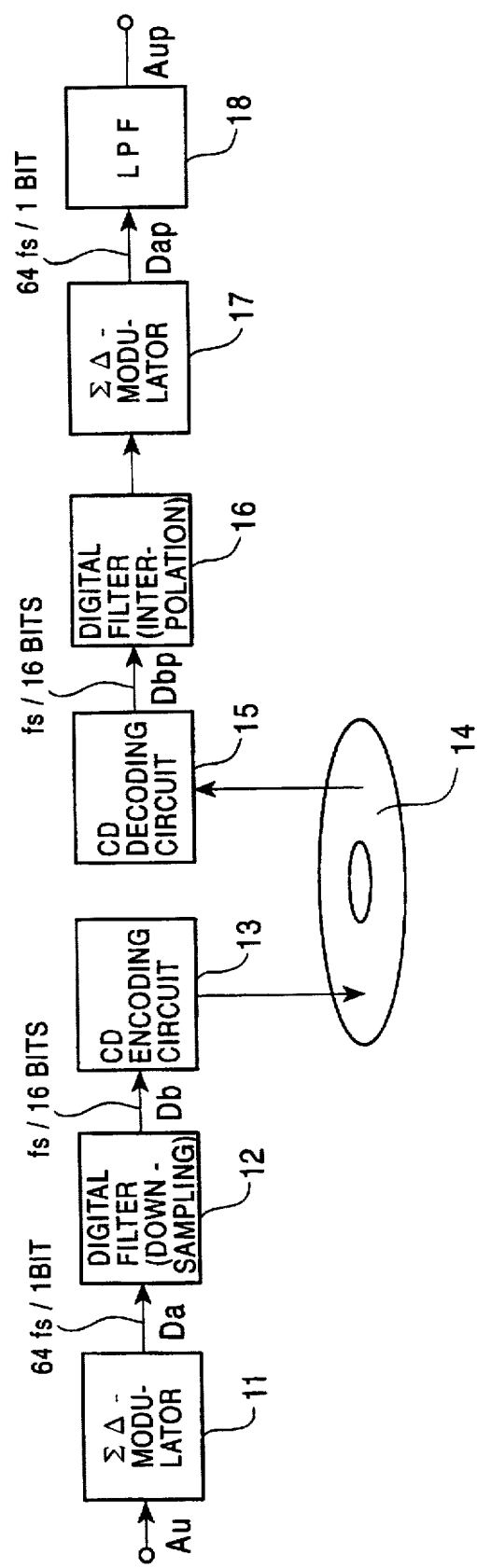
FIG. 1 is a block diagram showing the main components of a disc reproducing apparatus employing the analog-to-digital conversion and digital-to-analog conversion of ΣΔ-conversion method.

As described above, by directly recording the high speed 1-bit audio signal that is ΣΔ-modulated, the hardware of the reproducing system can be simplified as shown in FIG. 10, compared with the hardware of the conventional example shown in FIG. 1.

Also in the embodiment, by defining the TOC information in the disc as described above, the specification of the audio disc can be directly spread on the physical format based on the SD standard, and an inexpensive hardware with easy access to each track can be realized.

The sampling frequency in ΣΔ-modulation may be a multiple of the frequency of fs=44.1 kHz, preferably, not less than 16 times thereof.

The foregoing embodiments describe the case in which the next generation of compact discs whose standard is being unified is used as the disc-shaped recording medium according to the present invention. However, the present invention can be applied to a disc that has a recording capacity as same as the next generation of compact discs.

The reproducing apparatus according to the embodiment, shown in FIG. 10, is an example of reproducing apparatuses having only an audio disc. However, by providing two reproducing systems for both DVDs and audio discs in the apparatus, it is possible that the apparatus performs reproducing from each disc by determining the book type for changing over the two reproducing systems.

What is claimed is:

1. A reproducing apparatus for a disc-shaped recording medium having both a first recording region in which a digital audio signal is recorded and a second recording region in which signals including a discrimination signal for discriminating a type of said digital audio signal recorded in said first recording region are recorded, said digital audio signal having one bit per sample and being generated by performing a ΣΔ-modulation for converting an analog audio signal with a sampling frequency set to a multiple of a frequency fs for each channel where fs=44.1 kHz, said reproducing apparatus comprising:
reading means for reading said signals recorded in said disc-shaped recording medium;
determination means for determining whether said reproducing apparatus is loaded with said disc-shaped recording medium in which said digital audio signal is recorded and providing an output signal in accordance therewith, said digital audio signal having one bit per sample and being generated by performing said ΣΔ-modulation for converting an analog audio signal with a sampling frequency set to a multiple of fs for each channel at said frequency fs=44.1 kHz;

reproducing means for reproducing said digital audio signal having one bit per sample for each channel, from said output signal provided by said determination means and read by said reading means when said output signal indicates that said reproducing apparatus is loaded with said disc-shaped recording medium in which said digital audio signal is recorded, said digital audio signal having one bit per sample and being generated by performing said ΣΔ-modulation for converting said analog audio signal with the sampling frequency set to a multiple of said frequency fs for each channel at said frequency fs=44.1 kHz; and low-pass-filter means to which said digital audio signal having one bit per sample corresponding to each said channel, outputted by said reproducing means, is supplied and from which an analog audio signal is outputted.

2. A recording/reproducing method for a disc-shaped recording medium having both a first recording region in which a digital audio signal is recorded and a second recording region in which signals including a discrimination signal for discriminating a type of said digital audio signal recorded in said first recording region are recorded, said recording/reproducing method comprising the steps of:

performing a ΣΔ-modulation for converting an analog audio signal to a digital audio signal having one bit per sample by using a sampling frequency corresponding to n times a frequency fs for each channel, where said frequency fs=44.1 kHz, and n represents an integer;

recording said digital audio signal as a recorded signal having one bit per sample to said disc-shaped recording medium;

reproducing said digital audio signal having one bit per sample by reading said recorded signal and forming a reproduced digital audio signal; and outputting said reproduced digital audio signal having one bit per sample through a low-pass-filter.

3. The recording/reproducing method for a disc-shaped recording medium according to claim 2, wherein said recorded signal is read from said disc-shaped recording medium and it is determined, based on said discrimination signal recorded in said disc-shaped recording medium, whether said disc-shaped recording medium is a disc-shaped recording medium in which said digital audio signal is recorded, said digital audio signal having one bit per sample and being generated by performing said ΣΔ-modulation for converting said analog audio signal with a sampling frequency set to a multiple of a frequency fs so as to correspond to each said channel at said frequency fs=44.1 kHz.

4. The recording/reproducing method for a disc-shaped recording medium according to claim 2, wherein n represents an integer of not less than 16.

5. A disc-shaped recording medium comprising:

a first signal-recording region in which is recorded one of a digital audio signal or a digital audio signal having one bit per sample and being generated by using a sampling frequency corresponding to n times a frequency fs for each channel, where said frequency fs=44.1 kHz, and n represents an integer, is recorded; and a second signal-recording region formed inside said first signal-recording region in which signals including a discrimination signal are recorded, said discrimination signal discriminating whether, in said first signal-recording region, said digital audio signal having one bit per sample and being generated by using a sampling frequency corresponding to n times the frequency fs for each said channel, where said frequency fs=44.1 kHz, and n represents an integer, is recorded.

6. The disc-shaped recording medium according to claim 5, wherein in said first signal-recording region said digital audio signal is recorded in units of sectors each having a main data capacity of 2048 bytes excluding additional data.

7. The disc-shaped recording medium according to claim 5, wherein said digital audio signal having one bit per sample is recorded as 2048 bytes of main data by forming said digital audio signal into 8-bit unit data corresponding to each said channel.

8. The disc-shaped recording medium according to claim 5, wherein said discrimination signal is data representing a book type within physical format information of control data recorded in said second signal-recording region.

9. The disc-shaped recording medium according to claim 8, wherein information related to a recording-start position and a recording-end position of said digital audio signal recorded in said first signal-recording region is recorded, in addition to said discrimination signal, in said second signal-recording region.

10. The disc-shaped recording medium according to claim 5, including the step of forming said disc-shaped recording medium by cementing two disc members each having a recording layer on one surface, a diameter of approximately 12 cm, and a thickness of 0.6 mm.

11. The disc-shaped recording medium according to claim 5, wherein n represents an integer of not less than 16.

* * * * *